US012279111B2

United States Patent
Guo

(10) Patent No.: US 12,279,111 B2
(45) Date of Patent: Apr. 15, 2025

(54) WIRELESS COMMUNICATION METHOD, TERMINAL DEVICE AND NETWORK ELEMENT

(71) Applicant: GUANGDONG OPPO MOBILE TELECOMMUNICATIONS CORP., LTD., Dongguan (CN)

(72) Inventor: Yali Guo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 379 days.

(21) Appl. No.: 17/880,536

(22) Filed: Aug. 3, 2022

(65) Prior Publication Data

US 2022/0377547 A1    Nov. 24, 2022

Related U.S. Application Data

(63) Continuation of application No. PCT/CN2020/136203, filed on Dec. 14, 2020.

(51) Int. Cl.
*H04W 12/06*    (2021.01)

(52) U.S. Cl.
CPC .................................. *H04W 12/06* (2013.01)

(58) Field of Classification Search
CPC ..... H04W 12/06; H04W 60/04; H04W 12/50; H04W 12/71; H04W 12/72; H04W 12/065; H04W 12/61; H04W 12/63; H04W 60/00; H04W 84/042; H04W 84/06; G06F 2221/2117; H04L 63/0892
USPC ....................................................... 455/411
See application file for complete search history.

(56) References Cited

U.S. PATENT DOCUMENTS

| 2012/0237028 A1 | 9/2012 | Khazan et al. |
| 2021/0345117 A1 | 11/2021 | Zhang et al. |
| 2023/0102300 A1* | 3/2023 | Faccin ................ G08G 5/0078 |
| | | 455/435.1 |

FOREIGN PATENT DOCUMENTS

| CN | 109819440 A | 5/2019 |
| CN | 109995719 A | 7/2019 |
| CN | 111182543 A | 5/2020 |
| CN | 111436050 A | 7/2020 |
| CN | 111600916 A | 8/2020 |
| CN | 115699836 A | 2/2023 |

(Continued)

OTHER PUBLICATIONS

Priority Review issued in corresponding Chinese application No. 202310288541.8, mailed Jun. 28, 2024.

(Continued)

*Primary Examiner* — Tanmay K Shah
(74) *Attorney, Agent, or Firm* — BAYES PLLC

(57) ABSTRACT

The embodiments of the present application provide a wireless communication method, a terminal device and a network element. Said method comprises: determining a first target mode corresponding to a first operation, the first operation comprising at least one of authorization, authentication, re-authorization or re-authentication; and sending, on the basis of the first target mode, information for performing the first operation. In the embodiments of the present application, a first target mode corresponding to a first operation is determined, so that a terminal device can send, on the basis of the first target mode, information for performing the first operation.

16 Claims, 7 Drawing Sheets

(56) References Cited

FOREIGN PATENT DOCUMENTS

| EP | 3522668 B1 | 10/2020 |
|---|---|---|
| WO | 2016114830 A2 | 7/2016 |
| WO | 2016114830 A3 | 11/2016 |
| WO | 2018170703 A1 | 9/2018 |
| WO | 2019183858 A1 | 10/2019 |
| WO | 2020143569 A1 | 7/2020 |

OTHER PUBLICATIONS

First Office Action issued in corresponding Chinese application No. 202310288541.8, mailed Jul. 13, 2024.
Extended European Search Report issued in corresponding European application No. 20965345.0, mailed Mar. 28, 2023.
3GPP TR33.854 V0.3.0 (Nov. 2020); Technical Specification Group Services and System Aspects; Study on security aspects of Unmanned Aerial Systems (UAS) (Release 17).
Notice of Allowance issued in corresponding Vietnamese application No. 1-2022-05519, mailed Jul. 21, 2023.
First Office Action issued in corresponding European application No. 20965345.0, mailed Aug. 7, 2023.
Notice of Grant of Invention Patent Right issued in corresponding Chinese Application No. 202310288541.8, dated Dec. 23, 2024, 6 pages.
Second Examination Opinion Notice issued in corresponding Chinese Application No. 202310288541.8, dated Oct. 9, 2024, 6 pages.
International Search Report issued in International Application No. PCT/CN2020/136203, mailed Jul. 2, 2021, 4 pages.
Written Opinion of the International Searching Authority issued in International Application No. PCT/CN2020/136203, mailed Jul. 2, 2021, 9 pages.
3GPP TR 23.754 V1.2.0 (Nov. 2020); Technical Specification Group Services and System Aspects; Study on supporting Unmanned Aerial Systems (UAS) connectivity, Identification and tracking (Release 17), 140 pages.
3GPP TR 23.754 V2.0.0 (Nov. 2020); Technical Specification Group Services and System Aspects; Study on supporting Unmanned Aerial Systems (UAS) connectivity, Identification and tracking (Release 17), 140 pages.
3GPP TS 23.502 V15.11.0 (Sep. 2020); Technical Specification Group Services and System Aspects; Procedures for the 5G System (5GS); Stage 2 (Release 15), 363 pages.
"Discussion paper on FS_ID_UAS", C4-205455, Source: Qualcomm Incorporated, 3GPP TSG-CT WG4 Meeting #101e, E-Meeting, Nov. 3-13, 2020, 3 pages.
"Proposed allocation of documents to agenda items for CT4#101E: Notes", C4-205004, Source: Chairman, TSG-CT WG4, 3GPP TSG-CT WG4 Meeting #101E, E-Meeting; Nov. 3-13, 2020, 422 pages.

* cited by examiner

WIRELESS COMMUNICATION METHOD, TERMINAL DEVICE AND NETWORK ELEMENT

CROSS-REFERENCE TO RELATED APPLICATION

This application is a continuation of International Application No. PCT/CN2020/136203, filed on Dec. 14, 2020, which is incorporated herein by reference in its entirety.

TECHNICAL FIELD

The embodiments of the present application relate to the field of communications, and more particularly, to a wireless communication method, a terminal device, and a network element.

BACKGROUND

Up to now, the 3rd Generation Partnership Project (3GPP) network may participate in the authorization/authentication process of unmanned aerial vehicle (UAV) in two manners. One manner is that the unmanned aerial vehicle provides information for authorization/authentication during a registration process of accessing the 3GPP network, and the other manner is that the unmanned aerial vehicle provides information for authorization/authentication in a process of accessing the 3GPP network and establishing/modifying the Protocol Data Unit (PDU) session. In the two manners, different network elements of the 3GPP network participate in the authorization/authentication process between the unmanned aerial vehicle and the UTM/USS, and the authorization/authentication result is obtained.

In the specific implementation, the 3GPP network may choose any manner to participate in the authorization/authentication process of the UAV according to the configuration of the operator. However, since the UAV does not know the configuration condition of the network, the information for authorization/authentication is provided both in the registration process and the process of establishing/modifying the PDU session, which may cause the UAV to provide unnecessary and repeated information for authorization/authentication to the 3GPP network in different processes. In addition, when the UAV needs to be re-authorized/authenticated, the UAV cannot determine whether a registration process or a PDU session related process should be initiated to re-provide the information for authorization/authentication, resulting in the inability to re-authorize/authenticate the UVA.

SUMMARY

The embodiments of the present application provide a wireless communication method, a terminal device, and a network element, which can not only optimize the authorization/authentication process of the 3GPP network to the terminal device, but also avoid providing unnecessary repeated information for authorization/authentication to the 3GPP network, furthermore, the terminal device can be re-authorized/authenticated, thereby improving the system performance.

In a first aspect, a wireless communication method is provided, the method is applicable to a terminal device, and the method includes:

determining a first target manner corresponding to a first operation, where the first operation includes at least one of authorization, authentication, re-authorization or re-authentication; and sending information for performing the first operation based on the first target manner.

In a second aspect, a wireless communication method is provided, the method is applicable to a terminal management network element, and the method includes:

receiving a second request, where the second request is used for requesting at least one of following operations for a terminal device: re-authorization, re-authentication, revocation of authorization, or revocation of authentication;

determining a target network element; and sending the second request to the target network element.

In a third aspect, a wireless communication method is provided, the method is applicable to a mobility management network element, and the method includes:

receiving a third request, where the third request is used for requesting at least one of following operations for a terminal device: re-authorization, re-authentication, revocation of authorization, or revocation of authentication; and sending the third request to the terminal device.

In a fourth aspect, a wireless communication method is provided, the method is applicable to a policy control network element, and the method includes:

sending policy information to a terminal device through a mobility management network element, where the policy information includes a parameter corresponding to a first manner and/or a parameter corresponding to a second manner.

In a fifth aspect, a terminal device is provided, which is configured to execute the method in the above first aspect or each implementation manner thereof. Specifically, the terminal device includes a functional module for executing the method in the first aspect or each implementation manner thereof.

In a sixth aspect, a network element is provided for executing the method in any one of the above second aspect to the fourth aspect or each implementation manner thereof. Specifically, the network device includes a functional module for executing the method in any one of the above second aspect to the fourth aspect or each implementation manner thereof.

In a seventh aspect, a terminal device is provided, including a processor and a memory. The memory is used for storing a computer program, and the processor is used for calling and running the computer program stored in the memory, so as to execute the method in the above first aspect or each implementation manner thereof.

In an eighth aspect, a network element is provided, including a processor and a memory. The memory is used for storing a computer program, and the processor is used for calling and running the computer program stored in the memory, so as to execute the method in any one of the above second aspect to the fourth aspect or each implementation manner thereof.

In a ninth aspect, a chip is provided for implementing the method in any one of the above first to fourth aspects or each implementation manner thereof. Specifically, the chip includes: a processor for calling and running a computer program from a memory, so that a device installed with the chip executes any one of the above first to fourth aspects or each implementation manner thereof.

In a tenth aspect, a computer-readable storage medium is provided for storing a computer program, and the computer program causes a computer to execute the method in any one of the above first aspect to the fourth aspect or each implementation manner thereof.

In an eleventh aspect, a computer program product is provided, including computer program instructions, the computer program instructions causing a computer to perform the method in any one of the above first to fourth aspects or each implementation manner thereof.

In a twelfth aspect, a computer program is provided, where when the computer program is run on a computer, the computer is caused to perform the method in any one of the above first to fourth aspects or each implementation manner thereof.

Based on the above technical solutions, by determining the first target manner corresponding to the first operation, the terminal device can send information for performing the first operation based on the first target manner; based on this, in the case that the first operation is authorization/authentication, not only the authorization/authentication process of the 3GPP network to the terminal device can be optimized, but also unnecessary repetition of the information for authorization/authentication provided for the 3GPP network can be avoided. In the case that the first operation is re-authorization/authentication, the terminal device can be re-authorized/authenticated, thereby improving the system performance.

DETAILED DESCRIPTION

The technical solutions in the embodiments of the present application will be described below with reference to the accompanying drawings in the embodiments of the present application. Obviously, the described embodiments are part of the embodiments of the present application, not all of the embodiments. With regard to the embodiments in the present application, all other embodiments obtained by persons of ordinary skill in the art without creative efforts shall fall within the protection scope of the present application.

The embodiments of the present application can be applied to various communication systems, for example, a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an Advanced long term evolution (LTE-A) system, a New Radio (NR) system, an evolution system of NR system, a LTE-based access to unlicensed spectrum (LTE-U) system, an NR-based access to unlicensed spectrum (NR-U) system, a Universal Mobile Telecommunication System (UMTS), Wireless Local Area Networks (WLAN), Wireless Fidelity (WiFi), a next-generation communication system or other communication systems, etc.

Generally speaking, traditional communication systems support a limited number of connections, which are easy to be implemented. However, with the development of communication technology, mobile communication systems will not only support traditional communication, but also support, for example, Device to Device (D2D) communication, Machine to Machine (M2M) communication, Machine Type Communication (MTC), and Vehicle to Vehicle (V2V) communication, etc. The embodiments of the present application can also be applied to these communication systems.

Optionally, the communication system in the embodiments of the present application may be applied to a Carrier Aggregation (CA) scenario, a Dual Connectivity (DC) scenario, or a Standalone (SA) networking scenario.

The embodiments of the present application do not limit the applied spectrum. For example, the embodiments of the present application may be applied to a licensed spectrum, and may also be applied to an unlicensed spectrum.

Figure 1:
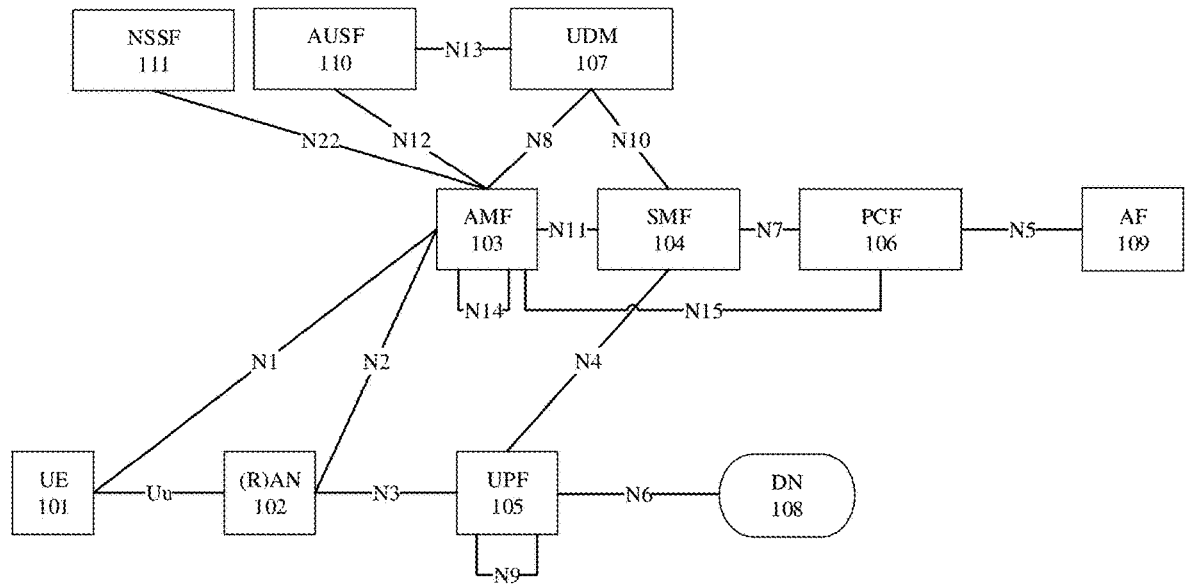
FIG. 1 is a schematic diagram of a communication system architecture provided by an embodiment of the present application.

FIG. 1 exemplarily shows a schematic diagram of a communication system 100 applied in the present application. As shown in FIG. 1, the communication system 100 mainly includes a terminal device (User Equipment, UE) 101, an Access Network (AN) device 102, an Access and Mobility Management Function (AMF) entity 103, a Session Management Function (SMF) entity 104, a User Plane Function (UPF) entity 105, a Policy Control function (PCF) entity 106, a Unified Data Management (UDM) entity 107, a Data Network (DN) 108, an Application Function (AF) entity 109, an Authentication Server Function (AUSF) entity 110, and a Network Slice Selection Function (NSSF) entity 111.

Specifically, in the communication system 100, the UE 101 performs an access stratum connection with the AN device 102 through a Uu interface to exchange an access stratum message and perform a wireless data transmission, and the UE 101 communicates with the AMF entity 103 through N1 interface for Non-Access Stratum (NAS) connection to exchange an NAS message; the AN device 102 is connected to the AMF entity 103 through N2 interface, and the AN device 102 is connected to the UPF entity 105 through N3 interface; multiple UPF entities 105 are connected through N9 interface, the UPF entity 105 is connected with the DN 108 through N6 interface, at the same time, the UPF entity 105 is connected with the SMF entity 104 through N4 interface; the SMF entity 104 is connected with the PCF entity 106 through N7 interface, the SMF entity 104 is connected with the UDM entity 107 through N10 interface, the SMF entity 104 controls the UPF entity 105 through N4 interface, and at the same time, the SMF entity 104 is connected to the AMF entity 103 through N11 interface; multiple AMF entities 103 are connected through N14 interface, the AMF entity 103 is connected to the UDM entity 107 through N8 interface, the AMF entity 103 is connected with the AUSF entity 110 through N12 interface, the AMF entity 103 is connected with the NSSF entity 111 through N22 interface, and at the same time, the AMF entity 103 is connected with the PCF entity 106 through N15 interface; the PCF entity 106 is connected with the AF entity 109 through N5 interface; and the AUSF entity 110 is connected to the UDM entity 107 through N13 interface.

In the communication system 100, the UDM entity 107 is a subscription database in the core network, and stores subscription data of users in the 5G network. The AMF entity 103 is a mobility management function in the core network, and the SMF entity 104 is a session management function in the core network. In addition to the mobility management for the UE 101, the AMF entity 103 is also responsible for forwarding messages related to session management between the UE 101 and SMF entity 104. The PCF entity 106 is a policy management function in the core network, and is responsible for formulating policies related to mobility management, session management, charging and the like for the UE 101. The UPF entity 105 is a user plane function in the core network, and performs data transmission with the external data network through N6 interface, and performs data transmission with the AN device 102 through N3 interface. After the UE 101 accesses the 5G network through the Uu interface, a Protocol Data Unit (PDU) session data connection between the UE 101 and the UPF entity 105 is established under the control of the SMF entity 104 to perform data transmission. The AMF entity 103 and the SMF entity 104 obtain user subscription data from the UDM entity 107 through N8 and N10 interfaces, respectively, and obtain policy data from the PCF entity 106 through N15 and N7 interfaces.

In addition, there is also a Network Exposure Function (NEF) entity in the communication system 100, which is used to interface with a third-party application server, and perform information transfer between the core network node and the third-party application.

It should be noted that the above communication system 100 is described by taking a 5G communication system as an example. The present application can also be applied to other 3GPP communication systems, such as a 4G communication system, or a future 3GPP communication system, which is not limited by the present application.

It should be understood that, in the embodiments of the present application, a device having a communication function in the network/system may be referred to as a communication device.

It should be understood that the terms "system" and "network" are often used interchangeably herein. The term "and/or" in the present disclosure is only an association relationship to describe the associated objects, indicating that there may be three kinds of relationships, for example, A and/or B may mean the following three cases: A exists alone, A and B exist at the same time, and B exists alone. In addition, the character "/" in the present disclosure generally indicates that the related objects are in an "or" relationship.

The embodiments of the present application describe various embodiments in conjunction with the terminal device and the network device, where the terminal device may also be referred to as user equipment, an access terminal, a subscriber unit, a subscriber station, a mobile station, a mobile platform, a remote station, a remote terminal, a mobile device, a user terminal, a terminal, a wireless communication device, a user agent or a user apparatus, etc. The terminal device may be a station (STAION, ST) in the WLAN, and may be a cellular phone, a cordless phone, a Session Initiation Protocol (SIP) phone, a Wireless Local Loop (WLL) station, a Personal Digital Assistant (PDA) device, a handheld device with a wireless communication capability, a computing device or other processing devices connected to a wireless modem, an in-vehicle device, a wearable device, and a next-generation communication system, such as a terminal device in the NR network or the terminal device in the future evolved Public Land Mobile Network (PLMN) network, etc.

As an example and not a limitation, in the embodiments of the present application, the terminal device may also be a wearable device. The wearable device may also be called a wearable smart device, which is a general term for devices being wearable that are developed through the intelligent design of daily wear using wearable technology, such as glasses, gloves, watches, clothing and shoes. The wearable device is a portable device that is worn directly on the body or integrated into the user's clothing or accessories. The wearable device is not only a hardware device, but also realizes powerful functions through software support, data interaction, and cloud interaction. In a broad sense, the wearable smart device includes: devices with full function, large-scale, capable of realizing complete or partial functions without relying on smart phones, such as smart watches or smart glasses; and devices that only focus on a certain type of application function and need to cooperate with other devices such as smart phones, such as all kinds of smart bracelets, smart jewelry, etc. for physical sign monitoring.

The above-mentioned AN device 102 may be a device for communicating with the mobile device, and the AN device 102 may be an Access Point (AP) in WLAN, a Base Transceiver Station (BTS) in GSM or CDMA, or a base station (NodeB, NB) in WCDMA, an Evolutional Node B (eNB or eNodeB) in LTE, or a relay station or access point, or a base station (gNB) in vehicle-mounted devices, wearable devices, and NR networks or a network device in the future evolved PLMN network, etc.

In the embodiments of the present application, the network device provides services for a cell, and the terminal device communicates with the network device through transmission resources (for example, frequency domain resources, or spectrum resources) used by the cell. The cell may be a cell corresponding to the network device (for example, the base station), the cell may belong to the macro base station, or it may belong to the base station corresponding to the Small cell. The Small cell here may include a Metro cell, a Micro cell, a Pico cell, a Femto cell, etc. These Small cells have the characteristics of small coverage and low transmit power, and are suitable for providing high-speed data transmission services.

Figure 2:
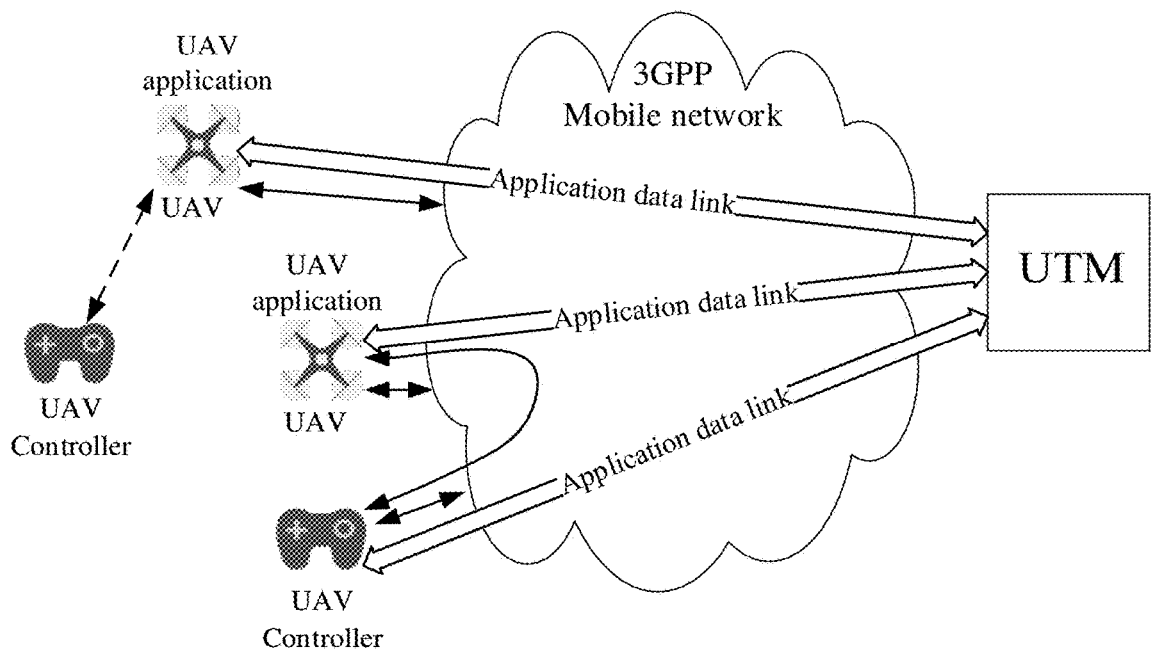
FIG. 2 is a schematic diagram of a UAV management and control provided according to an embodiment of the present application.
Figure 3:
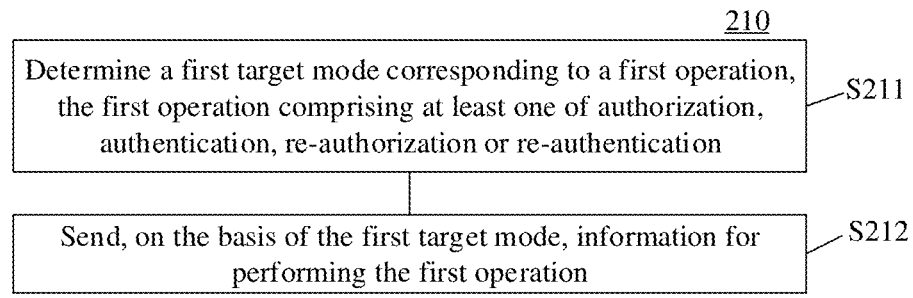
FIG. 3 to FIG. 12 are schematic flowcharts of wireless communication methods provided by embodiments of the present application.

With the development of the mobile communication technology, the terminal device for accessing the 3rd Generation Partnership Project (3GPP) mobile communication network is no longer limited to the terminal device held by people. More and more machinery equipment such as UAV will also become a wide range of wireless communication network usage scenarios. When UAV and other devices access the 3GPP network, they are also connected as terminal devices. As shown in FIG. 2, after the Unmanned Aerial Vehicle (UAV) accesses the 3GPP network, it may establish a connection with an Unmanned Aerial System Traffic Management (UTM) through the 3GPP network. The UTM is responsible for the registration, location tracking and other management functions of the UAV, and can control the behavior of the UAV, such as the flight route. After the UAV accesses the 3GPP network, it can also establish a connection with the UAV controller through the 3GPP network, so as to control the behavior of the UAV through the UAV controller.

The 3rd Generation Partnership Project (3GPP) network can participate in the authorization/authentication process of UAVs in two manners. One manner is that the UAV provides information for authorization/authentication during a registration process of accessing the 3GPP network, and the other manner is that the UAV provides information for authorization/authentication in the process of accessing the 3GPP network and establishing/modifying the Protocol Data Unit (PDU) session. In the two manners, different network elements of the 3GPP network participate in the authorization/authentication process between the UAV and the UTM/USS, and the authorization/authentication result is obtained.

In the specific implementation, the 3GPP network can choose any manner to participate in the authorization/authentication process of the UAV according to the configuration of the operator. However, since the UAV does not know the configuration condition of the network, the information for authorization/authentication is provided both in the registration process and the process of establishing/modifying the PDU session, which will cause the UAV to provide unnecessary repeated information for authorization/authentication to the 3GPP network in different processes. In addition, when the UAV needs to be re-authorized/authenticated, the UAV cannot determine whether a registration process or a PDU session related process should be initiated to re-provide the information for authorization/authentication, resulting in the inability to re-authorize/authenticate the UAV.

The embodiments of the present application provide a wireless communication method, a terminal device, and a network element, which can not only optimize the authorization/authentication process of the 3GPP network to the terminal device, but also avoid providing unnecessary repeated information for authorization/authentication for the 3GPP network. Moreover, the terminal device can be re-authorized/authenticated, thereby improving the system performance.

FIG. 2 shows a schematic flowchart of a wireless communication method 210 according to an embodiment of the present application, and the method 210 may be executed by a terminal device. The terminal device shown in FIG. 2 may be the terminal device shown in FIG. 1. Optionally, the terminal device in the embodiments of the present application may be an unmanned aerial vehicle device, or may be other types of terminal devices, including other types of machinery equipment or common handheld terminal devices, which are not limited in the present application.

As shown in FIG. 2, the method 210 may include the following steps.

In S211, a first target manner corresponding to a first operation is determined, where the first operation includes at least one of authorization, authentication, re-authorization or re-authentication.

In S212, information for performing the first operation is sent based on the first target manner.

Based on the above technical solutions, by determining the first target manner corresponding to the first operation, the terminal device can send the information for performing the first operation based on the first target manner; based on this, in the case that the first operation is authorization/authentication, not only can the authorization/authentication process of the 3GPP network to the terminal device be optimized, but also unnecessary repetition of the authorization/authentication information for the 3GPP network can be avoided. In the case that the first operation is re-authorization/authentication, the terminal device can be re-authorized/authenticated, thereby improving the system performance.

It should be noted that, the embodiments of the present application do not specifically limit the information for performing the first operation. For example, the information for authorization/authentication includes, but is not limited to, at least one of the following: UAV identification, UAV serial number, pilot information, manufacturer information, UAV type or weight information, etc.

In some embodiments of the present application, the first target manner includes a first manner and/or a second manner, and the first manner refers to that the terminal device sends the information for performing the first operation through a registration process, and the second manner refers to that the terminal device sends the information for performing the first operation through a session management process; the S212 may include:

in the case that the first target manner is the first manner, sending the information for performing the first operation through a mobility management network element;

in the case that the first target manner is the second manner, sending the information for performing the first operation through a session management network element.

It should be noted that the mobility management network element in the embodiments of the present application may be, for example, an Access and Mobility Management Function (AMF) in a 5G communication system, and may also be an entity with the mobility management function in other 3GPP communication systems, which is not limited in the present application. Similarly, the session management network element in the embodiments of the present application may be, for example, a Session Management Function (SMF) in the 5G communication system, and may also be an entity with a session management function in other 3GPP communication systems, which is not limited in the present application.

In addition, in the embodiments of the present application, the first manner and the second manner may also express corresponding processes in other description manners. For example, the first manner refers to that the terminal device sends the information for performing the first operation through the mobility management network element or a mobility management message, and the second manner refers to that the terminal device sends the information for performing the first operation through the session management network element or a session management message. For another example, the first manner refers to that the terminal device performs the first operation through the mobility management network element, and the second manner refers to that the terminal device performs the first operation through the session management network element, which are not specifically limited by the embodiments of the present application.

In some embodiments of the present application, the S211 may include:

receiving a first request, where the first request is used to request re-authorization and/or re-authentication for the terminal device; and determining the first target manner based on the manner of acquiring the first request.

In other words, when the UTM/USS needs to perform the first operation on the UAV, the UAV provides the information for performing the first operation through the corresponding 3GPP process according to the manner of obtaining the first request from the 3GPP network.

Optionally, when the first request is received from the mobility management network element, the first manner is determined as the first target manner; when the first request is received from the session management network element, the second manner is determined as the first target manner.

In some embodiments of the present application, the method 210 may further include:

receiving first indication information sent by a mobility management network element, where the first indication information is used to determine the first target manner.

In other words, when the UTM/USS needs to perform the first operation on the UAV, the UAV provides the information for performing the first operation through the corresponding 3GPP process according to the first indication information in the first request obtained from the 3GPP network.

Optionally, the first indication information is used to instruct the terminal device to use the first manner or the second manner; the S211 may include: determining the first manner or the second manner indicated by the first indication information as the first target manner.

Optionally, the first indication information is used to indicate whether the first manner is supported or not, and/or the first indication information is used to indicate whether the second manner is supported or not; the S211 may include: determining the supported manner indicated by the first indication information as the first target manner.

Optionally, the first request sent by the mobility management network element is received, where the first request is used to request the re-authorization and/or re-authentication, and the first request includes the first indication information.

In some embodiments of the present application, the method 210 may further include:

receiving a first request sent by the mobility management network element, where the first request is used to request the re-authorization and/or re-authentication; the S211 may include: when the first request does not include the information for indicating the first target manner, determining the second manner as the first target manner.

In other words, when the UTM/USS needs to perform the first operation on the UAV, if the first request obtained from the 3GPP network does not include the information for indicating the first target manner, the UAV determines the second manner as the first target manner by default.

In some embodiments of the present application, the S211 may include:

receiving policy information, where the policy information includes a parameter corresponding to the first manner and/or a parameter corresponding to the second manner; and determining the first target manner based on the policy information.

Optionally, the policy information sent by the policy control network element is received through the mobility management network element.

Optionally, when the parameter of the terminal device matches the parameter corresponding to the first manner, the first manner is determined as the first target manner; when the parameter of the terminal device matches the parameter corresponding to the second manner, the second manner is determined as the first target manner.

Optionally, the parameter belongs to at least one of the following information: area information, Public Land Mobile Network (PLMN) information or time information.

Optionally, the policy information further includes an identifier of the terminal device.

In some embodiments of the present application, the method 210 may further include:

receiving second indication information, where the second indication information is used to indicate revocation of authorization and/or authentication.

Optionally, the second indication information forwarded by the session management network element is received through the mobility management network element.

Optionally, the second indication information forwarded by the terminal management network element is received by the mobility management network element.

Optionally, the second indication information forwarded by the terminal management network element is received by the session management network element.

Figure 4:
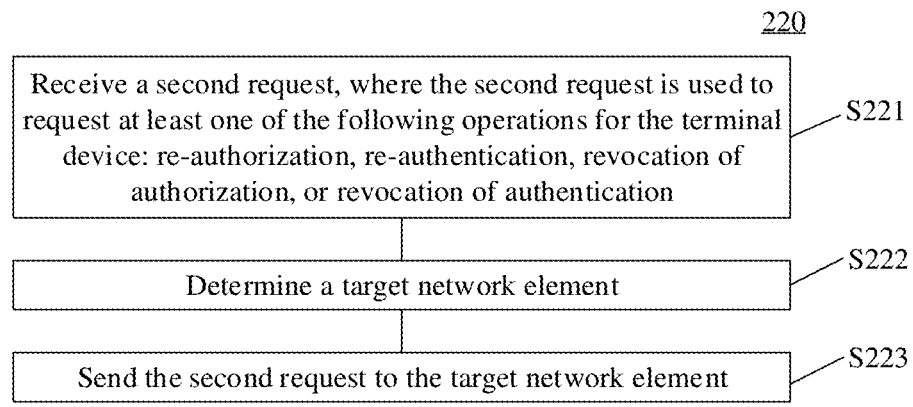

FIG. 4 shows a schematic flowchart of a wireless communication method 220 according to an embodiment of the present application, and the method 220 may be executed by a terminal management network element. Optionally, the terminal management network element may be used to manage the terminal device, and the terminal device may be unmanned aerial vehicle equipment or other types of terminal device, including other types of machinery equipment or ordinary handheld terminal device, which is not limited by the present application. For example, the terminal management network element may be an Unmanned Aerial Vehicle Function (UAVF) or an entity having the UAVF.

As shown in FIG. 4, the method 220 may include the following steps.

In S221, a second request is received, where the second request is used to request at least one of the following operations for the terminal device: re-authorization, re-authentication, revocation of authorization, or revocation of authentication.

In S222, a target network element is determined.

In S223, the second request is sent to the target network element.

In some embodiments of the present application, the S222 may include:

determining a session management network element as the target network element.

In some embodiments of the present application, the S222 may include:

determining a second target manner corresponding to a second operation, the second operation including at least one of authorization, authentication, re-authorization or re-authentication, revocation of authorization or revocation of authentication; determining the target network element based on the second target manner.

In some embodiments of the present application, the second target manner includes a first manner and/or a second manner, the first manner refers to that the terminal device sends the information for performing the second operation through a registration process, and the second manner refers to that the terminal device sends the information for performing the second operation through the session management process; based on this, in the case that the second target manner is the first manner, the mobility management network element is determined as the target network element; in the case that the second target manner is the second manner, the session management network element is determined as the target network element.

In some embodiments of the present application, the second target manner is determined based on a first mapping relationship, where the first mapping relationship includes a parameter corresponding to the first manner and/or a parameter corresponding to the second manner.

Optionally, in the case that the parameter of the terminal device matches the parameter corresponding to the first manner, the first manner is determined as the second target manner; when the parameter of the terminal device matches the parameter corresponding to the second manner, the second manner is determined as the second target manner.

Optionally, the parameter belongs to at least one of the following information:

area information, Public Land Mobile Network (PLMN) information or time information.

Optionally, the first mapping relationship information is preconfigured.

In some embodiments of the present application, query information is obtained through a unified data storage (UDR) or a unified data management (UDM), where the query information is used to indicate information of the mobility management network element and/or session management network element serving the terminal device, and/or, the query information is used to indicate whether the mobility management network element and/or the session management network element supports the second operation; the second target manner is determined based on the query information.

Figure 5:
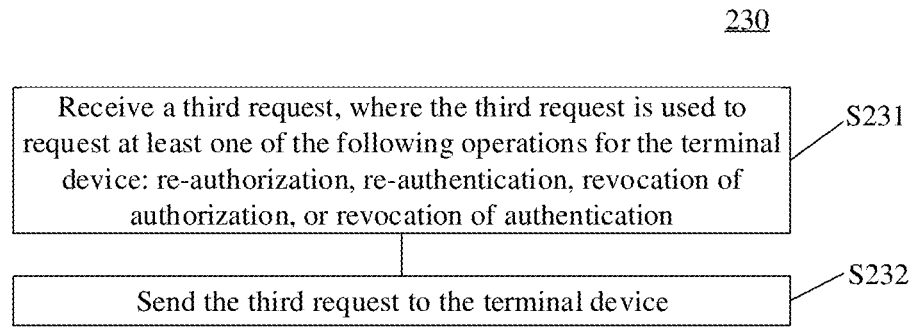

FIG. 5 shows a schematic flowchart of a wireless communication method 230 according to an embodiment of the present application, and the method 230 may be executed by a mobility management network element. The mobility management network element in the embodiments of the present application may be, for example, an Access and Mobility Management Function (AMF) in a 5G communication system, and may also be an entity having mobility management function in other 3GPP communication systems, which is not limited in the present application.

As shown in FIG. 5, the method 230 may include the following steps.

In S231, a third request is received, where the third request is used to request at least one of the following operations for the terminal device: re-authorization, re-authentication, revocation of authorization, or revocation of authentication.

In S232, the third request is sent to the terminal device.

In some embodiments of the present application, the S231 may include:

receiving the third request sent by the terminal management network element.

In some embodiments of the present application, the S231 may include:

receiving the third request sent by the session management network element.

In some embodiments of the present application, the third request includes first indication information, where the first indication information is used to determine the first target manner corresponding to the first operation, and the first operation includes at least one of authorization, authentication, re-authorization or re-authentication.

In some embodiments of the present application, the first target manner includes a first manner and/or a second manner, the first manner refers to that the terminal device sends the information for performing the first operation through a registration process, and the second manner refers to that the terminal device sends the information for performing the first operation through a session management process.

In some embodiments of the present application, the first indication information is used to instruct the terminal device to use the first manner or the second manner.

In some embodiments of the present application, the first indication information is used to indicate whether the first manner is supported or not, and/or the first indication information is used to indicate whether the second manner is supported or not.

In some embodiments of the present application, if the third request does not include information for indicating the first target manner corresponding to the first operation, the first target manner is the second manner, and the first operation includes at least one of authorization, authentication, re-authorization or re-authentication, and the second manner refers to that the terminal device sends the information for performing the first operation through a session management process.

Figure 6:
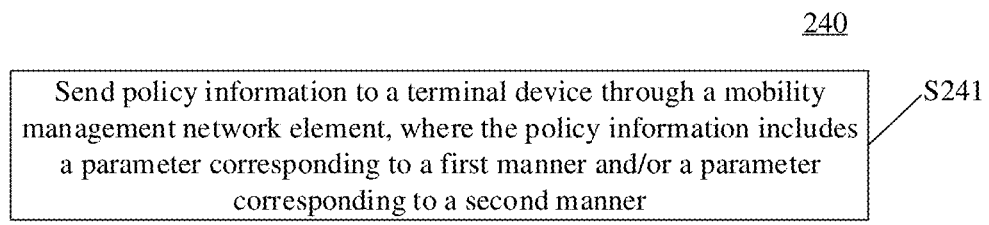

FIG. 6 shows a schematic flowchart of a wireless communication method 240 according to an embodiment of the present application. The method 240 may be executed by a policy control network element. The policy control network element in the embodiments of the present application may be, for example, a Policy Control function (PCF) in a 5G communication system, and may also be an entity with a policy control function in other 3GPP communication systems, which is not limited by the present application.

As shown in FIG. 6, the method 240 may include the following steps.

In S241, policy information is sent to a terminal device through a mobility management network element, where the policy information includes a parameter corresponding to a first manner and/or a parameter corresponding to a second manner.

Optionally, the parameter belongs to at least one of the following information:

area information, Public Land Mobile Network (PLMN) information or time information.

Optionally, the policy information further includes an identifier of the terminal device.

Optionally, the first manner refers to that the terminal device sends information for performing the first operation through a registration process, and the second manner refers to that the terminal device sends the information for performing the first operation through a session management process. The first operation includes at least one of authorization, authentication, re-authorization, or re-authentication.

It should be understood that the method process performed by each network element and the method process performed by the terminal device may refer to each other. For example, for the steps in the above-mentioned methods 220/230/240, reference may be made to the corresponding steps in the method 210, which are not repeated here for brevity.

The methods provided by the embodiments of the present application will be described below with reference to specific embodiments.

In some embodiments of the present application, when the UTM/USS needs to re-authorize/authenticate the UAV, a re-authorization/authentication request is sent to the UAVF in the 3GPP network, and the UAVF obtains a re-authorization/authentication manner for the UAV, sends the re-authorization/authentication request to the corresponding network element according to the obtained re-authorization/authentication manner, and further the re-authorization/authentication request is sent to the UAV by the corresponding network element. The UAV provides the re-authorization/ authentication information through the corresponding 3GPP process according to the way of obtaining the re-authorization/authentication request from the 3GPP network.

Figure 7:
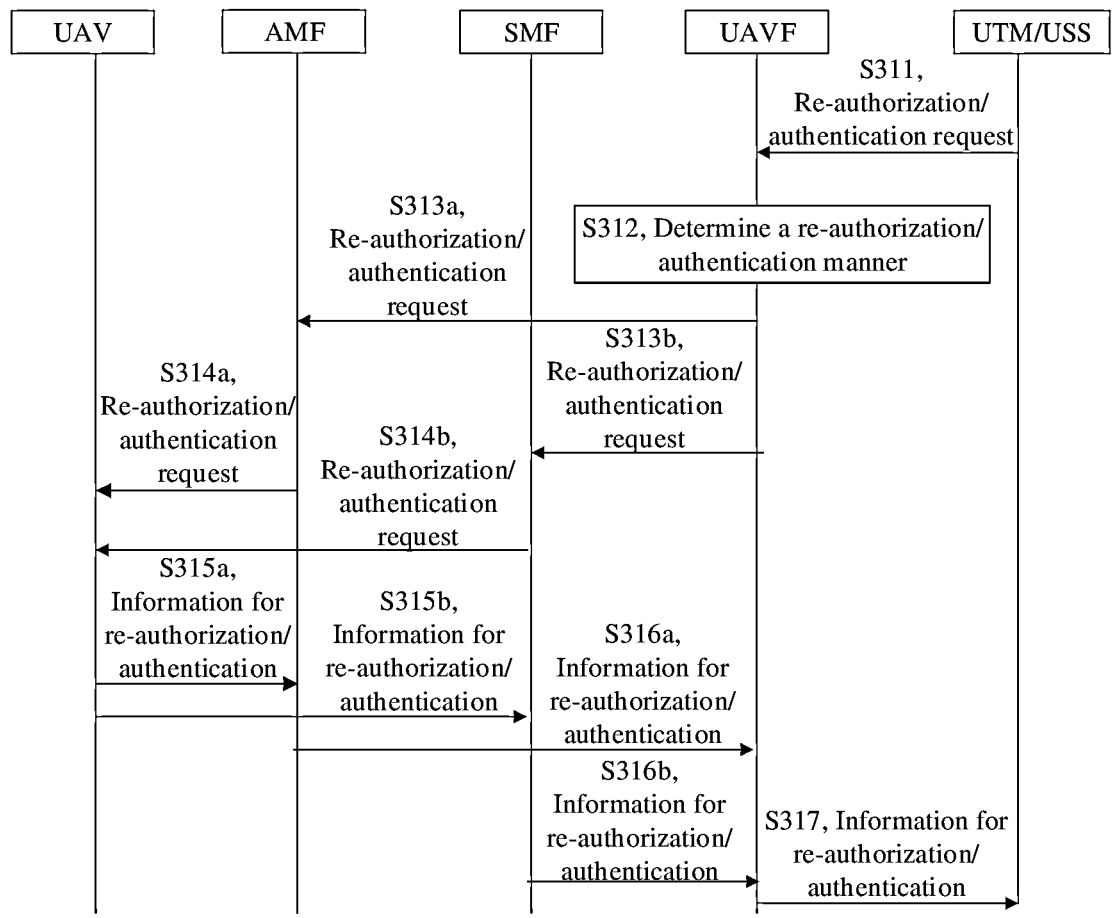

FIG. 7 is a schematic interaction flowchart of a wireless communication method 310 provided by an embodiment of the present application. The method 310 may be performed interactively by Unmanned Aerial Vehicle (UAV), AMF, SMF, UAVF, and Unified Threat Management (UTM)/UAS Service Supplier (USS). Optionally, the UAV in the embodiments of the present application may also be referred to as an unmanned aerial vehicle device, and may also be replaced by other types of terminal devices, including other types of machinery equipment or common handheld terminal devices, which are not limited in the present application. Similarly, AMF may be replaced with other mobility management network elements, SMF may also be replaced with other session management network elements, and UAVF may be replaced with other terminal management network elements. Also, optionally, the UTM/USS may be any server with data processing capabilities.

As shown in FIG. 7, the method 310 may include some or all of the following contents.

In S311, the UTM/USS needs to re-authorize/authenticate the UAV, and sends the re-authorization/authentication request to the UAVF in the 3GPP network.

In S312, the UAVF determines the re-authorization/authentication manner.

Optionally, the first manner is to re-authorize/authenticate the UAV through a mobility management network element, such as AMF, and the second manner is to use a session management network element, such as SMF, to re-authorize/authenticate the UAV.

Optionally, the UAVF determines the re-authorization/authentication manner by including but not limited to the following manners.

First Manner

The re-authorization/authentication manner of UAV is configured on the UAVF. For example, for the re-authorization/authentication manner of the UAV corresponding to the Public Land Mobile Network (PLMN) or area information, the UAVF may determine the corresponding re-authorization/authentication manner according to the PLMN or area information where the UAV is located.

Second Manner

The UAVF obtains the re-authorization/authentication manner of the UAV by querying the UDM and/or UDR. For example, the AMF and/or SMF information serving the UAV is obtained by querying the UDM, and whether the AMF and/or SMF supports the re-authorization/authentication of the UAV is obtained by querying the UDR.

If it is determined that the re-authorization/authentication manner of the UAV is the first manner, the following steps are performed.

In S313a, the UAVF sends a re-authorization/authentication request to the mobility management network element (e.g., AMF).

In S314a, the mobility management network element (e.g., AMF) sends the re-authorization/authentication request to the UAV.

In S315a, information for re-authorization/authentication is sent to the mobility management network element (e.g., AMF) through a registration process.

In S316a, the mobility management network element (e.g., AMF) sends the information for re-authorization/authentication to the UAVF.

In S317, the UAVF sends the re-authorization/authentication information to the UTM/USS.

If it is determined that the re-authorization/authentication manner of the UAV is the second manner, the following steps are performed.

In S313b, the UAVF sends the re-authorization/authentication request to the session management network element (e.g., SMF).

In S314b, the session management network element (e.g., SMF) sends the re-authorization/authentication request to the UAV.

In S315b, the information for re-authorization/authentication is sent to the session management network element (e.g., SMF) through a session management process.

In S316b, the session management network element (e.g., SMF) sends the information for re-authorization/authentication to the UAVF.

For S313a-S316a and S313b-S316b, the UAV determines a 3GPP process for providing information for re-authorization/authentication according to the manner of obtaining the re-authorization/authentication request from the 3GPP network. If the re-authorization/authentication request is obtained from the mobility management message, the information for re-authorization/authentication is sent to the mobility management network element, such as the AMF, through the registration process (e.g., the mobility management message). If the re-authorization/authentication request is obtained from the session management message, the information for re-authorization/authentication is sent to the session management network element, such as SMF, through the session management process (e.g., the session management message).

In some embodiments of the present application, when the UTM/USS needs to withdraw the authorization/authentication of the UAV, an indication of revoking the authorization/authentication is sent to the UAVF in the 3GPP network, and the UAVF obtains the manner of withdrawing authorization/authentication of the UAV, according to the obtained manner of withdrawing authorization/authentication, the indication of revocation of authorization/authentication is sent to the corresponding network element, and the corresponding network element further sends the indication of revocation of authorization/authentication to the UAV.

Figure 8:
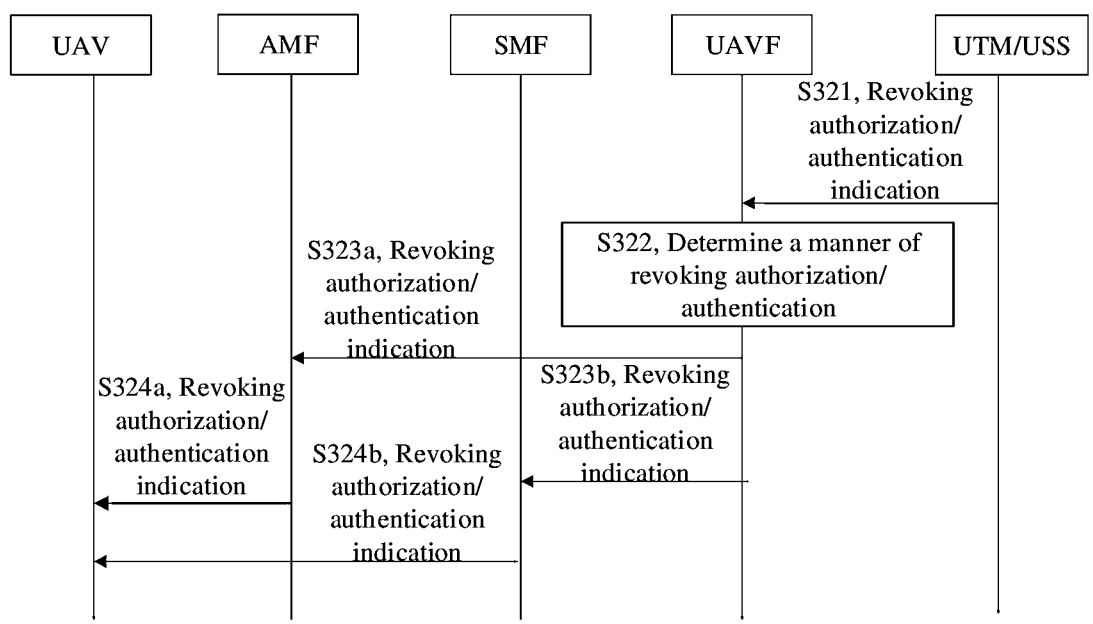

FIG. 8 is a schematic interaction flowchart of a wireless communication method 320 provided by an embodiment of the present application. The method 320 may be performed interactively by Unmanned Aerial Vehicle (UAV), AMF, SMF, UAVF, and Unified Threat Management (UTM)/UAS Service Supplier (USS). Optionally, the UAV in the embodiments of the present application may also be referred to as an unmanned aerial vehicle device, and may also be replaced by other types of terminal devices, including other types of machinery equipment or common handheld terminal devices, which are not limited in the present application. Similarly, AMF may be replaced with other mobility management network elements, SMF may also be replaced with other session management network elements, and UAVF may be replaced with other terminal management network elements. Also, optionally, the UTM/USS may be any server with data processing capabilities.

As shown in FIG. 8, the method 320 may include some or all of the following contents.

In S321, the UTM/USS needs to revoke the authorization/authentication with respect to the UAV, and sends a revoking authorization/authentication indication to the UAVF in the 3GPP network.

In S322, the UAVF determines the manner of revoking the authorization/authentication. It should be understood that, for the specific implementation of the UAVF determining the manner of revoking authorization/authentication, reference may be made to S312 in the method 310, that is, the UAVF determines the re-authorization/authentication manner, which is not repeated here to avoid repetition.

If it is determined that the authorization/authentication manner for the UAV is the first manner, the following steps are performed.

In S323a, the UAVF sends a revoking authorization/authentication indication to the mobility management network element, such as the AMF.

In S324a, the mobility management network element sends the revoking authorization/authentication indication to the UAV. For example, the AMF sends the revoking authorization/authentication indication to the UAV.

If it is determined that the authorization/authentication manner for the UAV is the second manner, the following steps are performed.

In S323b, the UAVF sends the revoking authorization/authentication indication to the session management network element, such as the SMF.

In S324b, the session management network element sends the revoking authorization/authentication indication to the UAV. For example, the SMF sends the revoking authorization/authentication indication to the UAV.

In some embodiments of this application, when the UTM/USS needs to re-authorize/authenticate the UAV, the re-authorization/authentication request is sent to the UAVF in the 3GPP network, and the UAVF sends the re-authorization/authentication request to the SMF. The SMF sends the re-authorization/authentication request to the AMF, the AMF sends the re-authorization/authentication request to the UAV, and the AMF also sends the information for determining the re-authorization/authentication manner to the UAV. The UAV provides information for re-authorization/authentication through a corresponding 3GPP procedure according to the information for determining the re-authorization/authentication manner obtained from the AMF.

Figure 9:
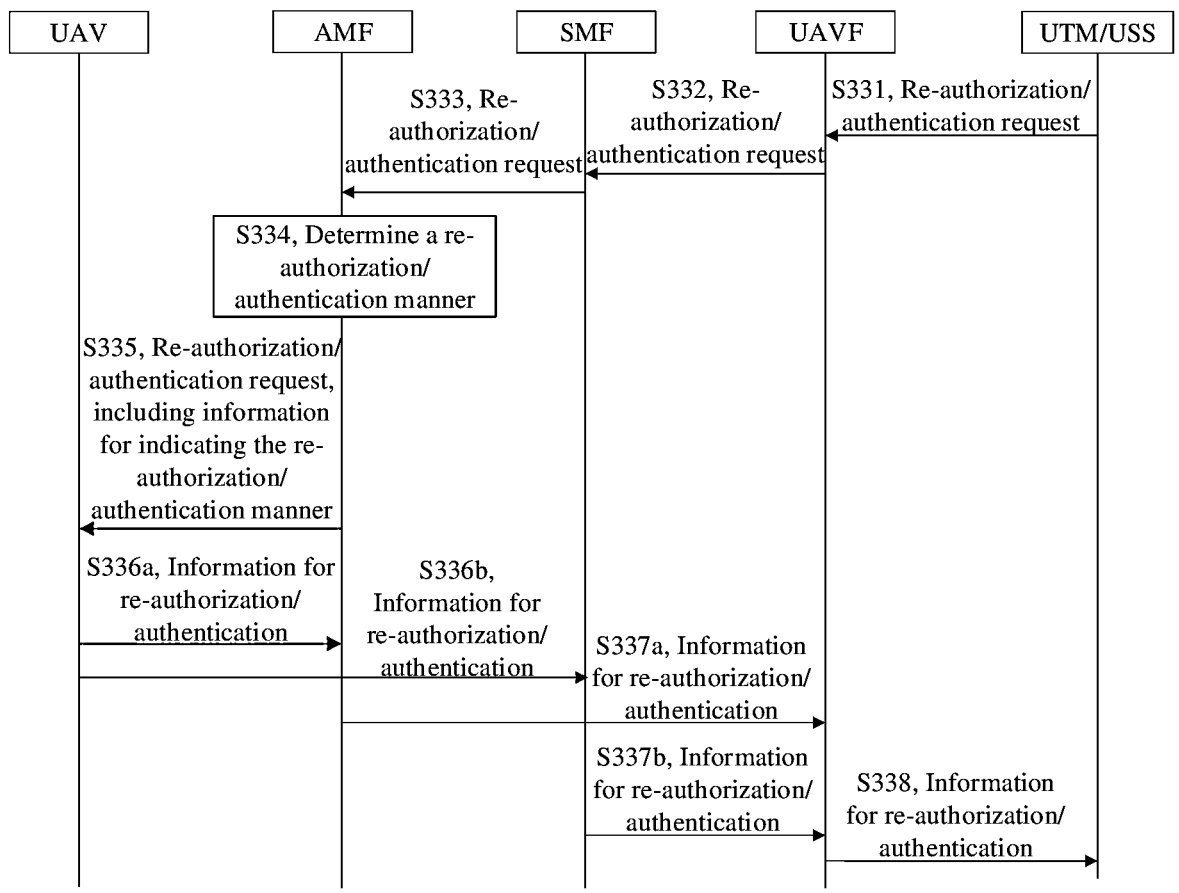

FIG. 9 is a schematic interaction flowchart of a wireless communication method 330 provided by an embodiment of the present application. The method 330 may be performed interactively by Unmanned Aerial Vehicle (UAV), AMF, SMF, UAVF, and Unified Threat Management (UTM)/UAS Service Supplier (USS). Optionally, the UAV in the embodiments of the present application may also be referred to as an unmanned aerial vehicle device, and may also be replaced by other types of terminal devices, including other types of machinery equipment or common handheld terminal devices, which are not limited in the present application. Similarly, AMF may be replaced with other mobility management network elements, SMF may also be replaced with other session management network elements, and UAVF may be replaced with other terminal management network elements. Also, optionally, the UTM/USS may be any server with data processing capabilities.

As shown in FIG. 9, the method 330 may include some or all of the following contents.

In S331, the UTM/USS needs to re-authorize/authenticate the UAV, and sends a re-authorization/authentication request to the UAVF in the 3GPP network.

In S332, the UAVF sends the re-authorization/authentication request to the session management network element (e.g., SMF).

In S333, the session management network element (for example, SMF) sends the re-authorization/authentication request to the mobility management network element (for example, AMF).

In S334, the mobility management network element (for example, AMF) determines the re-authorization/authentication manner.

In S335, the mobility management network element (e.g., AMF) sends the re-authorization/authentication request to the UAV. The mobility management network element (e.g., AMF) also sends information for determining the re-authorization/authentication manner to the UAV. The first manner is to re-authorize/authenticate the UAV through a mobility management network element (e.g., AMF), and the second manner is to perform UAV authorization/authentication through a session management network element (e.g., SMF). The information for determining the re-authorization/authentication manner sent by the AMF to the UAV includes, but is not limited to, the following contents:

a), directly instructing the UAV to use the first manner or the second manner;

b), indicating that the network side supports or does not support the first manner or the second manner;

c), no indication.

Based on this, the UAV determines the 3GPP procedure used to provide the re-authorization/authentication information according to the information obtained from the AMF for determining the re-authorization/authentication manner. If the UAV determines that the re-authorization/authentication manner is the first manner according to the AMF, the following steps are performed.

In S336a, the UAV sends information for re-authorization/authentication to the mobility management network element (e.g., AMF).

In S337a, the mobility management network element (e.g., AMF) sends the information for re-authorization/authentication to the UAVF.

If the UAV determines that the re-authorization/authentication manner is the second manner according to the AMF, the following steps are performed.

In S336b, the UAV sends the information for re-authorization/authentication to the session management network element (e.g., SMF).

In S337b, the session management network element (e.g., SMF) sends the information for re-authorization/authentication to the UAVF.

For S336a~S337a and S336b~S337b, if the AMF directly instructs the UAV to use the first manner or the second manner, in the first manner, the re-authorization/authentication information is sent to the mobility management network element, such as AMF, through the registration process (such as a mobility management message), and in the second manner, the re-authorization/authentication information is sent to the session management network element, such as SMF, through the session management process (e.g., a session management message). If the AMF indicates that the network side does not support the first manner, the re-authorization/authentication information is sent to the session management network element, such as SMF, through the session management process (e.g., a session management message). If the AMF indicates that the network side supports the first manner, the re-authorization/authentication information is sent to the mobility management network element, such as the AMF, through the registration process (e.g., a mobility management message). If there is no indication, the second manner is adopted by default, and the re-authorization/authentication information is sent to the session management network element, such as SMF, through the session management process (e.g., the session management message).

In S338, the UAVF sends the re-authorization/authentication information to UTM/USS.

In some embodiments of the present application, when the UTM/USS needs to withdraw the authorization/authentication of the UAV, it sends an indication of withdrawing the authorization/authentication to the UAVF in the 3GPP network, and the UAVF sends the indication of withdrawing the authorization/authentication to SMF, the SMF sends the indication of withdrawing the authorization/authentication to the AMF, and the AMF sends the indication of withdrawing the authorization/authentication to the UAV.

Figure 10:
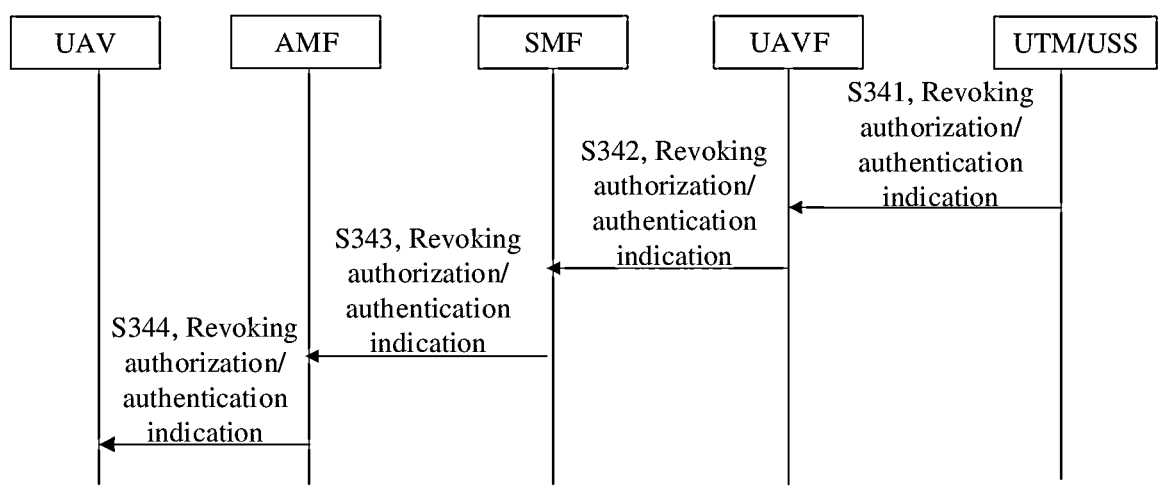

FIG. 10 is a schematic interaction flowchart of a wireless communication method 340 provided by an embodiment of the present application. The method 340 may be performed interactively by Unmanned Aerial Vehicle (UAV), AMF, SMF, UAVF, and Unified Threat Management (UTM)/UAS Service Supplier (USS). Optionally, the UAV in the embodiments of the present application may also be referred to as an unmanned aerial vehicle device, and may also be replaced by other types of terminal devices, including other types of machinery equipment or common handheld terminal devices, which are not limited in the present application. Similarly, AMF may be replaced with other mobility management network elements, SMF may also be replaced with other session management network elements, and UAVF may be replaced with other terminal management network elements. Also, optionally, the UTM/USS may be any server with data processing capabilities.

As shown in FIG. 10, the method 340 may include some or all of the following contents.

In S341, the UTM/USS needs to revoke the authorization/authentication to the UAV, and sends a revoking authorization/authentication indication to the UAVF in the 3GPP network.

In S342, the UAVF sends the revoking authorization/authentication indication to the session management network element (e.g., SMF).

In S343, the session management network element (e.g., SMF) sends the revoking authorization/authentication indication to the mobility management network element (e.g., AMF).

In S344, the mobility management network element (e.g., the AMF) sends the revoking authorization/authentication indication to the UAV.

In some embodiments of the present application, policy information is configured on the UAV, and the UAV provides authorization/authentication information through a corresponding 3GPP procedure according to the configured policy information.

Figure 11:
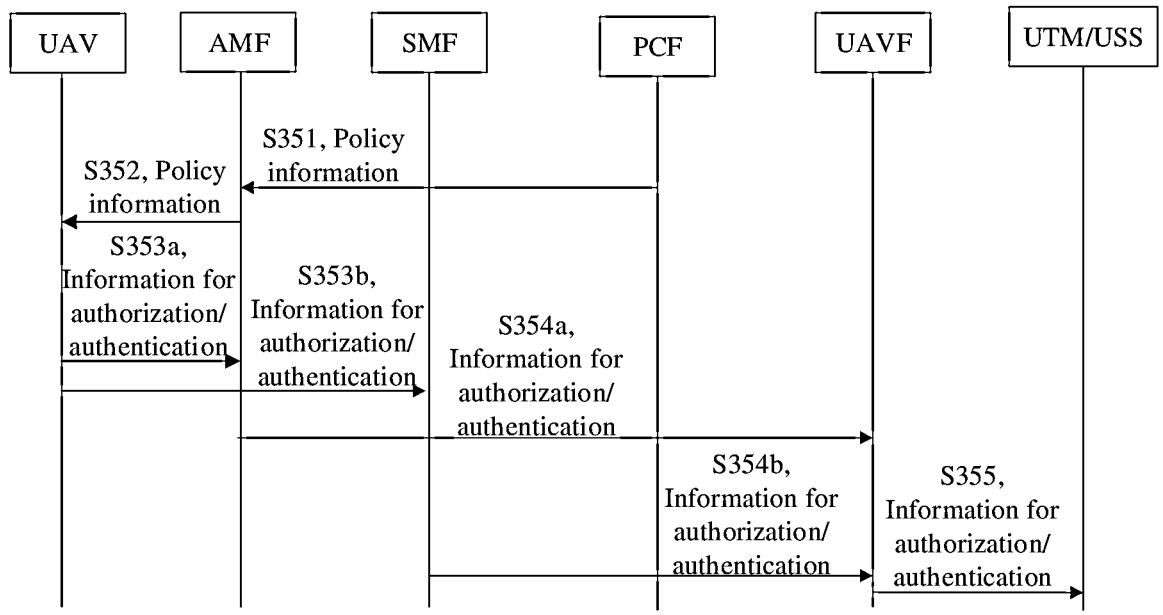

FIG. 11 is a schematic interaction flowchart of a wireless communication method 350 provided by an embodiment of the present application. The method 340 may be performed by interaction of Unmanned Aerial Vehicle (UAV), AMF, SMF, UAVF, PCF, and Unified Threat Management (UTM)/UAS Service Supplier (USS). Optionally, the UAV in the embodiments of the present application may also be referred to as an unmanned aerial vehicle device, and may also be replaced by other types of terminal devices, including other types of machinery equipment or common handheld terminal devices, which are not limited in the present application. Similarly, AMF may be replaced with other mobility management network elements, SMF may also be replaced with other session management network elements, UAVF may be replaced with other terminal management network elements, and PCF may also be replaced with other policy control network elements. Also, optionally, the UTM/USS may be any server with data processing capabilities.

As shown in FIG. 11, the method 350 may include some or all of the following contents.

In S351, the policy control network element (e.g. PCF) sends the policy information to the mobility management network element (e.g. AMF).

Optionally, the policy information includes:
a parameter: area information, PLMN information, time information, etc.;
selecting an authorization/authentication manner corresponding to the parameter: a first manner is to perform UAV authorization/authentication through a mobility management network element (such as AMF), and/or a second manner is to perform UAV authorization/authentication through a session management network element (such as SMF).

Optionally, the policy information may further include: a UAV identifier.

In S352, the mobility management network element (for example, the AMF) sends the policy information to the UAV.

If the UAV determines that the authorization/authentication manner is the first manner according to the policy information, the following steps are performed.

In S353a, the UAV sends information for authorization/authentication to a mobility management network element (e.g., AMF).

In S354a, the mobility management network element (e.g., AMF) sends the information for authorization/authentication to the UAVF.

If the UAV determines that the authorization/authentication manner is the second manner according to the policy information, the following steps are performed.

In S353b, the UAV sends the information for authorization/authentication to the session management network element (e.g., SMF).

S354b, the session management network element (e.g., SMF) sends the information for authorization/authentication to the UAVF.

For S353a-S354a and S353b-S354b, the UAV determines the 3GPP process used for the information for authorization/authentication according to the policy information. For example, the 3GPP process used for the information for authorization/authentication is determined according to a matching situation of the network information, location information, time information, etc. where the UAV is currently located and the information in the policy information. If it is the first manner, the information for authorization/authentication is sent to the mobility management network element (e.g., AMF) through the registration process (e.g., a mobility management message). If it is the second manner, the information for authorization/authentication is sent to the session management network element (e.g., SMF) through the session management process (e.g., a session management message).

In S355b, the UAVF sends the information for authorization/authentication to the UTM/USS.

In some embodiments of the present application, when the UTM/USS needs to re-authorize/authenticate the UAV, the re-authorization/authentication request is sent to the UAVF in the 3GPP network, and the UAVF sends the re-authorization/authentication request to the SMF. The SMF sends the re-authorization/authentication request to the AMF, and the AMF sends the re-authorization/authentication request to the UAV. The UAV determines the re-authorization/authentication manner according to the configured policy information, and provides the information for re-authorization/authentication through the corresponding 3GPP process.

Figure 12:
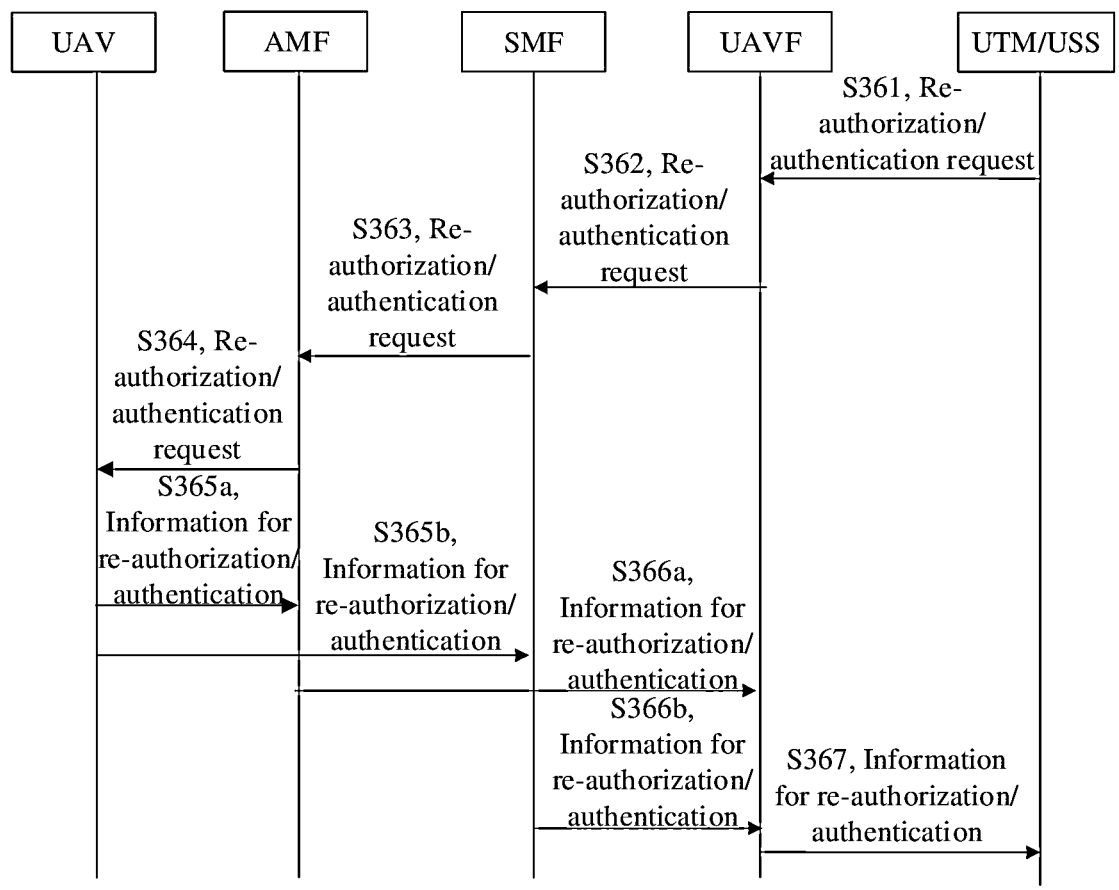

FIG. 12 is a schematic interaction flowchart of a wireless communication method 360 provided by an embodiment of the present application. The method 360 may be performed interactively by Unmanned Aerial Vehicle (UAV), AMF, SMF, UAVF, and Unified Threat Management (UTM)/UAS Service Supplier (USS). Optionally, the UAV in the embodiments of the present application may also be referred to as an unmanned aerial vehicle device, and may also be replaced by other types of terminal devices, including other types of machinery equipment or common handheld terminal devices, which are not limited in the present application. Similarly, AMF may be replaced with other mobility management network elements, SMF may also be replaced with other session management network elements, and UAVF may be replaced with other terminal management network elements. Also, optionally, the UTM/USS may be any server with data processing capabilities.

As shown in FIG. 12, the method 360 may include some or all of the following contents.

In S361, the UTM/USS needs to re-authorize/authenticate the UAV, and sends a re-authorization/authentication request to the UAVF in the 3GPP network.

In S362, the UAVF sends the re-authorization/authentication request to the session management network element (for example, SMF).

In S363, the session management network element (for example, SMF) sends the re-authorization/authentication request to the mobility management network element (for example, AMF).

In S364, the mobility management network element (e.g., AMF) sends the re-authorization/authentication request to the UAV.

Based on this, the UAV can determine the re-authorization/authentication manner based on the policy information. It should be understood that the UAV determines the re-authorization/authentication manner based on the policy information, which is similar to the UAV determining the authorization/authentication manner based on the policy information in method 350. To avoid repetition, details are not repeated here.

If the UAV determines that the authorization/authentication manner is the first manner according to the policy information, the following steps are performed.

In S365a, the UAV sends information for re-authorization/authentication to a mobility management network element (e.g., AMF).

In S366a, the mobility management network element (e.g., AMF) sends the information for re-authorization/authentication to the UAVF.

If the UAV determines that the authorization/authentication manner is the second manner according to the policy information, the following steps are performed.

In S365b, the UAV sends the information for re-authorization/authentication to the session management network element (e.g., SMF).

In S366b, the session management network element (for example, SMF) sends the information for re-authorization/authentication to the UAVF.

For S365a~S366a and S365b~S366b, the UAV determines the 3GPP process used for the information for re-authorization/authentication according to the policy information. For example, the 3GPP process used for the information for re-authorization/authentication is determined according to the matching situation of the network information, location information, time information, etc. where the UAV is currently located and the information in the policy information. If it is the first manner, the information for re-authorization/authentication is sent to the mobility management network element (e.g., AMF) through the registration process (e.g., a mobility management message). If it is the second manner, the information for re-authorization/authentication is sent to the session management network element (e.g., SMF) through the session management process (e.g., a session management message).

In S367, the UAVF sends the information for re-authorization/authentication to the UTM/USS.

It should be understood that FIGS. 1 to 12 are only examples of the present application, and should not be construed as limitations of the present application.

For example, in other embodiments of the present application, the process of re-authorization/authentication of the UAV by the method 310 and the method 330 can also be applied to the process of authorization/authentication of the UAV, which is equivalent to that the UAV does not need to perform authorization/authentication while being powered on, but could perform the authorization/authentication process until the network receives the indication of the authorization/authentication manner.

Embodiments of the present application have been described in detail above with reference to the accompanying drawings. However, the present application is not limited to the specific details of the above-mentioned embodiments. Within the scope of the technical concept of the present application, various simple modifications can be made to the technical solutions of the present application. These simple modifications all belong to the protection scope of the present application. For example, the various specific technical features described in the above-mentioned specific embodiments can be combined in any suitable manner under the condition of no contradiction. In order to avoid unnecessary repetition, the present application does not describe the various possible combinations. For another example, the various embodiments of the present application can also be combined arbitrarily, as long as they do not violate the idea of the present application, they should also be regarded as the content disclosed in the present application. It should also be understood that, in the various method embodiments of the present application, the size of the sequence numbers of the above-mentioned processes does not mean the sequence of execution, and the execution sequence of each process should be determined by its functions and internal logic, and should not constitute any limitation on the implementation procedure of the embodiments of the present application. In addition, in the embodiments of the present application, the term "and/or" is only an association relationship for describing associated objects, indicating that there may be three kinds of relationships. Specifically, A and/or B may represent three situations: A exists alone, A and B exist at the same time, and B exists alone. In addition, the character "/" in the present disclosure generally indicates that the related objects are in an "or" relationship.

The method embodiments of the present application are described in detail above with reference to FIGS. 1 to 12, and the apparatus embodiments of the present application are described in detail below.

Figure 13:
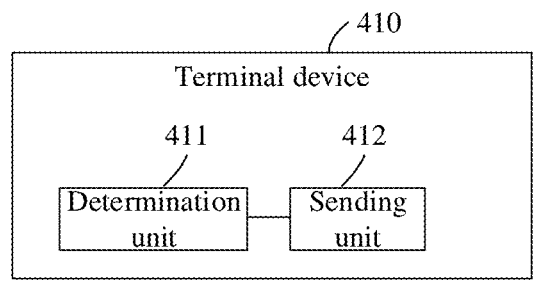
FIG. 13 is a schematic block diagram of a terminal device provided by an embodiment of the present application.

FIG. 13 is a schematic block diagram of a terminal device 410 according to an embodiment of the present application.

As shown in FIG. 13, the terminal device 410 may include:

a determination unit 411, configured to determine a first target manner corresponding to a first operation, where the first operation includes at least one of authorization, authentication, re-authorization or re-authentication; and a sending unit 412, configured to send information for performing the first operation based on the first target manner.

In some embodiments of the present application, the first target manner includes a first manner and/or a second manner, the first manner refers to that the terminal device sends information for performing the first operation through a registration process, and the second manner refers to that the terminal device sends the information for performing the first operation through a session management process; the sending unit 412 is specifically configured to:
if the first target manner is the first manner, send the information for performing the first operation through a mobility management network element; if the first target manner is the second manner, send the information for performing the first operation through a session management network element.

In some embodiments of the present application, the determination unit 411 is specifically configured to:
receive a first request, the first request being used to request re-authorization and/or re-authentication for the terminal device;
based on a manner of obtaining the first request, determine the first target manner.

In some embodiments of the present application, the determination unit 411 is specifically configured to:
in the case of receiving the first request from the mobility management network element, determine the first manner as the first target manner;
in the case of receiving the first request from the session management network element, determine the second manner as the first target manner.

In some embodiments of the present application, the sending unit 412 is further configured to:
receive first indication information sent by the mobility management network element, where the first indication information is used to determine the first target manner.

In some embodiments of the present application, the first indication information is used to instruct the terminal device to use the first manner or the second manner; the determination unit 411 is specifically configured to:
determine the first manner or the second manner indicated by the first indication information as the first target manner.

In some embodiments of the present application, the first indication information is used to indicate whether the first manner is supported or not, and/or the first indication information is used to indicate whether the second manner is supported or not. The determination unit 411 is specifically configured to:
determine the supported manner indicated by the first indication information as the first target manner.

In some embodiments of the present application, the sending unit 412 is specifically configured to:
receive a first request sent by the mobility management network element, where the first request is used to request the re-authorization and/or re-authentication, and the first request includes the first indication information.

In some embodiments of the present application, the sending unit 412 is further configured to:
receive a first request sent by the mobility management network element, where the first request is used to request the re-authorization and/or re-authentication; the determination unit 411 is specifically configured to:
in a case where the first request does not include information for indicating the first target manner, determine the second manner as the first target manner.

In some embodiments of the present application, the sending unit 412 is further configured to:
receive policy information, where the policy information includes a parameter corresponding to the first manner and/or a parameter corresponding to the second manner; the determination unit 411 is specifically configured to:
determine the first target manner based on the policy information.

In some embodiments of the present application, the sending unit 412 is specifically configured to:
receive the policy information sent by the policy control network element through the mobility management network element.

In some embodiments of the present application, the determination unit 411 is specifically configured to:
in the case that a parameter of the terminal device matches the parameter corresponding to the first manner, determine the first manner as the first target manner; if the parameter of the terminal device matches the parameter corresponding to the second manner, determine the second manner as the first target manner.

In some embodiments of the present application, the parameter belongs to at least one of the following information:
area information, Public Land Mobile Network (PLMN) information or time information.

In some embodiments of the present application, the policy information further includes an identifier of the terminal device.

In some embodiments of the present application, the sending unit 412 is specifically configured to:
receive second indication information, where the second indication information is used to indicate revocation of authorization and/or authentication.

In some embodiments of the present application, the sending unit 412 is specifically configured to:
receive, through the mobility management network element, the second indication information forwarded by the session management network element;
receive, through the mobility management network element, the second indication information forwarded by the terminal management network element; or
receive, through the session management network element, the second indication information forwarded by the terminal management network element.

Figure 14:
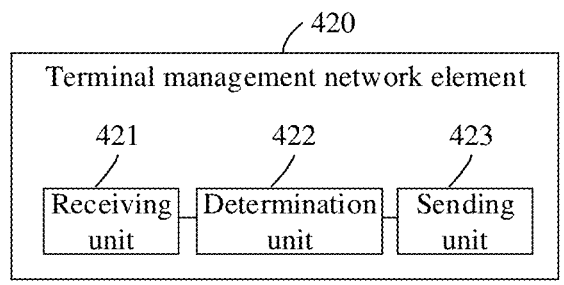
FIG. 14 is a schematic block diagram of a terminal management network element provided by an embodiment of the present application.

FIG. 14 is a schematic block diagram of a terminal management network element 420 provided by an embodiment of the present application.

As shown in FIG. 14, the terminal management network element 420 may include:
a receiving unit 421, configured to receive a second request, where the second request is used to request at least one of the following operations for the terminal device: re-authorization, re-authentication, revocation of authorization or revocation of authentication;
a determination unit 422, configured to determine a target network element;
a sending unit 423, configured to send the second request to the target network element.

In some embodiments of the present application, the determination unit 422 is specifically configured to:
determine the session management network element as the target network element.

In some embodiments of the present application, the determination unit 422 is specifically configured to:
  determine a second target manner corresponding to a second operation, where the second operation includes at least one of authorization, authentication, re-authorization or re-authentication, revocation of authorization or revocation of authentication;
  determine the target network element based on the second target manner.

In some embodiments of the present application, the second target manner includes a first manner and/or a second manner, the first manner refers to that the terminal device sends the information for performing the second operation through a registration process, and the second manner refers to that the terminal device sends the information for performing the second operation through the session management process; the determination unit 422 is specifically configured to:
  if the second target manner is the first manner, determine the mobility management network element as the target network element; if the second target manner is the second manner, determine the session management network element as the target network element.

In some embodiments of the present application, the determination unit 422 is further configured to:
  determine the second target manner based on a first mapping relationship, where the first mapping relationship includes a parameter corresponding to the first manner and/or a parameter corresponding to the second manner.

In some embodiments of the present application, the determination unit 422 is specifically configured to:
  in the case that a parameter of the terminal device matches the parameter corresponding to the first manner, determine the first manner as the second target manner; if the parameter of the terminal device matches the parameter corresponding to the second manner, determine the second manner as the second target manner.

In some embodiments of the present application, the parameter belongs to at least one of the following information:
  area information, Public Land Mobile Network (PLMN) information or time information.

In some embodiments of the present application, the first mapping relationship information is preconfigured.

In some embodiments of the present application, the determination unit 422 is specifically configured to:
  obtain query information through unified data storage (UDR) or unified data management (UDM), where the query information is used to indicate the information of the mobility management network element and/or session management network element serving the terminal device, and/or, the query information is used to indicate whether the mobility management network element and/or the session management network element supports the second operation;
  based on the query information, determine the second target manner.

Figure 15:
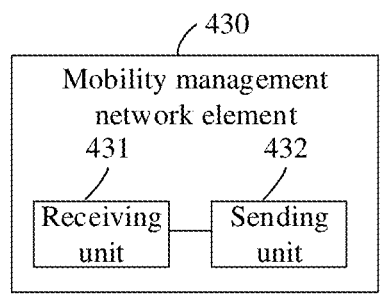
FIG. 15 is a schematic block diagram of a mobility management network element provided by an embodiment of the present application.

FIG. 15 is a schematic block diagram of a mobility management network element 430 provided by an embodiment of the present application.

As shown in FIG. 15, the mobility management network element 430 may include:
  a receiving unit 431, configured to receive a third request, where the third request is used to request at least one of the following operations for the terminal device: re-authorization, re-authentication, revocation of authorization or revocation of authentication;
  a sending unit 432, configured to send the third request to the terminal device.

In some embodiments of the present application, the receiving unit 431 is specifically configured to:
  receive the third request sent by the terminal management network element.

In some embodiments of the present application, the receiving unit 431 is specifically configured to:
  receive the third request sent by the session management network element.

In some embodiments of the present application, the third request includes first indication information, where the first indication information is used to determine the first target manner corresponding to the first operation, where the first operation includes at least one of authorization, authentication, re-authorization or re-authentication.

In some embodiments of the present application, the first target manner includes a first manner and/or a second manner, the first manner refers to that the terminal device sends the information for performing the first operation through a registration process, and the second manner refers to that the terminal device sends the information for performing the first operation through a session management process.

In some embodiments of the present application, the first indication information is used to instruct the terminal device to use the first manner or the second manner.

In some embodiments of the present application, the first indication information is used to indicate whether the first manner is supported or not, and/or the first indication information is used to indicate whether the second manner is supported or not.

In some embodiments of the present application, if the third request does not include information for indicating the first target manner corresponding to the first operation, the first target manner is the second manner, and the first operation includes at least one of authorization, authentication, re-authorization or re-authentication, and the second manner refers to that the terminal device sends the information for performing the first operation through a session management process.

Figure 16:
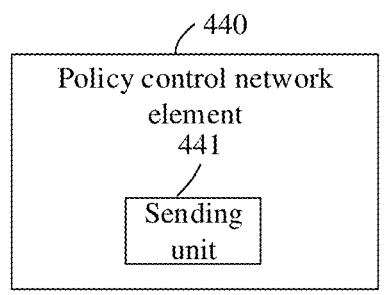
FIG. 16 is a schematic block diagram of a policy control network element provided by an embodiment of the present application.

FIG. 16 is a schematic block diagram of a policy control network element 440 provided by an embodiment of the present application.

As shown in FIG. 16, the policy control network element 440 may include:
  a sending unit 441, configured to send policy information to the terminal device through the mobility management network element, where the policy information includes a parameter corresponding to the first manner and/or a parameter corresponding to the second manner.

In some embodiments of the present application, the parameter belongs to at least one of the following information:
  area information, Public Land Mobile Network (PLMN) information or time information.

In some embodiments of the present application, the policy information further includes an identifier of the terminal device.

In some embodiments of the present application, the first manner refers to that the terminal device sends the information for performing the first operation through a registration process, and the second manner refers to that the terminal device sends the information for performing the first operation through a session management process. The first operation includes at least one of authorization, authentication, re-authorization, or re-authentication.

It should be understood that, in the present application, the apparatus embodiments and the method embodiments may correspond to each other, and for similar descriptions, reference may be made to the method embodiments. Specifically, the terminal device 410 shown in FIG. 13, the terminal management network element 420 shown in FIG. 14, the mobility management network element shown in FIG. 15, and the policy control network element shown in FIG. 16 may correspond to the corresponding subjects in the method of performing the embodiments of the present application, and the foregoing and other operations and/or functions of each unit in the terminal device 410 shown in FIG. 13, the terminal management network element 420 shown in FIG. 14, the mobility management network element shown in FIG. 15, and the policy control network element shown in FIG. 16 are respectively to implement the corresponding processes in each method, and are not repeated here for the sake of brevity.

The communication device of the embodiments of the present application is described above from the perspective of functional modules with reference to the accompanying drawings. It should be understood that the functional modules can be implemented in the form of hardware, can also be implemented by instructions in the form of software, and can also be implemented by a combination of hardware and software modules. Specifically, the steps of the method embodiments in the embodiments of the present application may be completed by an integrated logic circuit of hardware and/or instructions in the form of software in the processor, and the steps of the methods disclosed in combination with the embodiments of the present application may be directly executed and completed by a hardware decoding processor, or executed and completed by a combination of hardware and software modules in the decoding processor. Optionally, the software modules may be located in a random access memory, a flash memory, a read-only memory, a programmable read-only memory, an electrically erasable programmable memory, a register, and other storage media mature in the art. The storage medium is located in the memory, and the processor reads the information in the memory, and completes the steps in the above method embodiments in combination with its hardware. For example, the determination unit and the communication unit referred to above may be implemented by a processor and a transceiver, respectively.

Figure 17:
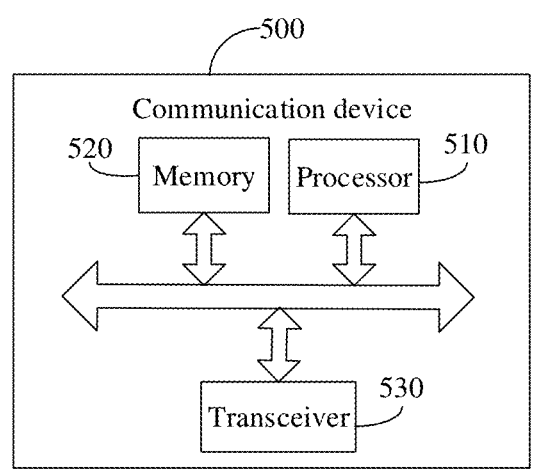
FIG. 17 is a schematic block diagram of a communication device provided by an embodiment of the present application.

FIG. 17 is a schematic structural diagram of a communication device 500 according to an embodiment of the present application.

As shown in FIG. 17, the communication device 500 may include a processor 510.

The processor 510 may call and run a computer program from the memory to implement the methods in the embodiments of the present application.

Continuing to refer to FIG. 17, the communication device 500 may further include a memory 520.

The memory 520 may be used to store instruction information, and may also be used to store codes, instructions, etc. executed by the processor 510. The processor 510 may call and run a computer program from the memory 520 to implement the methods in the embodiments of the present application. The memory 520 may be a separate device independent of the processor 510, or may be integrated in the processor 510.

Continuing to refer to FIG. 17, the communication device 500 may further include a transceiver 530.

The processor 510 may control the transceiver 530 to communicate with other devices, specifically, may send information or data to other devices, or receive information or data sent by other devices. The transceiver 530 may include a transmitter and a receiver. The transceiver 530 may further include an antenna, and the number of the antennas may be one or more.

It should be understood that individual components in the communication device 500 are connected through a bus system, where the bus system includes a power bus, a control bus and a status signal bus in addition to a data bus.

It should also be understood that the communication device 500 may be a terminal device of the embodiments of the present application, and the communication device 500 may implement the corresponding processes implemented by the terminal device in each method of the embodiments of the present application. That is, the communication device 500 of the embodiments of the present application may correspond to the terminal device 410 in the embodiments of the present application, and may correspond to the corresponding subject executing the method 200 according to the embodiments of the present application, which is not repeated here for brevity. Similarly, the communication device 500 may be each network element in the embodiments of the present application, and the communication device 500 may implement corresponding processes implemented by corresponding network elements in each method in the embodiments of the present application. That is to say, the communication device 500 in the embodiments of the present application may correspond to the terminal device 410 shown in FIG. 13, the terminal management network element 420 shown in FIG. 14, and the mobility management network element shown in FIG. 15, or the policy control network element shown in FIG. 16 in the embodiments of the present application, and may correspond to the corresponding subject executing the method according to the embodiments of the present application, which is not repeated here for brevity.

In addition, the embodiment of the present application also provides a chip.

For example, the chip may be an integrated circuit chip, which has a signal processing capability, and can implement or execute the methods, steps, and logic block diagrams disclosed in the embodiments of the present application. The chip may also be referred to as a system-level chip, a system chip, a chip system, a system-on-a-chip, or the like. Optionally, the chip can be applied to various communication devices, so that the communication device installed with the chip can execute the methods, steps and logic block diagrams disclosed in the embodiments of the present application.

Figure 18:
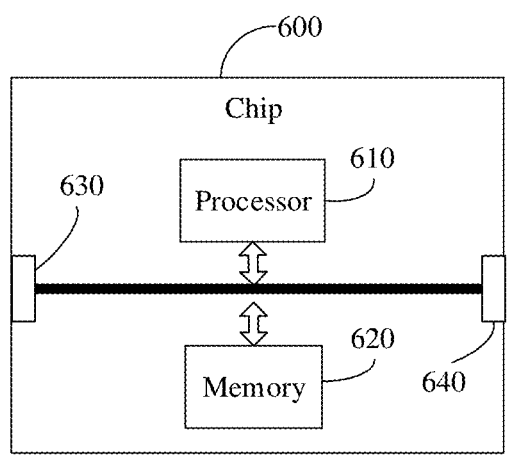
FIG. 18 is a schematic block diagram of a chip provided by an embodiment of the present application.

FIG. 18 is a schematic structural diagram of a chip 600 according to an embodiment of the present application.

As shown in FIG. 18, the chip 600 includes a processor 610.

The processor 610 may call and run a computer program from the memory to implement the methods in the embodiments of the present application.

Continuing to refer to FIG. 18, the chip 600 may further include a memory 620.

The processor 610 may call and run a computer program from the memory 620 to implement the methods in the embodiments of the present application. The memory 620 may be used to store instruction information, and may also be used to store codes, instructions and the like executed by the processor 610. The memory 620 may be a separate device independent of the processor 610, or may be integrated in the processor 610.

Continuing to refer to FIG. 18, the chip 600 may further include an input interface 630.

The processor 610 may control the input interface 630 to communicate with other devices or chips, and specifically, may acquire information or data sent by other devices or chips.

Continuing to refer to FIG. 18, the chip 600 may further include an output interface 640.

The processor 610 can control the output interface 640 to communicate with other devices or chips, and specifically, can output information or data to other devices or chips.

It should be understood that the chip 600 can be applied to the network device in the embodiments of the present application, and the chip can implement the corresponding processes implemented by the network device in the various methods in the embodiments of the present application, and can also implement the various methods in the embodiments of the present application. For the sake of brevity, the corresponding processes implemented by the terminal device in FIG. 1 are not repeated here.

It should also be understood that various components in the chip 600 are connected through a bus system, where the bus system includes a power bus, a control bus and a status signal bus in addition to a data bus.

The processors referred to above may include, but are not limited to:

a general-purpose processor, a digital Signal Processor (DSP), an Application Specific Integrated Circuit (ASIC), a Field Programmable Gate Array (FPGA) or other programmable logic devices, discrete gates or transistor logic devices, discrete hardware components, and so on.

The processor may be used to implement or execute the methods, steps, and logical block diagrams disclosed in the embodiments of the present application. The steps of the method disclosed in conjunction with the embodiments of the present application may be directly embodied as executed by a hardware decoding processor, or executed by a combination of hardware and software modules in the decoding processor. The software module may be located in a random access memory, a flash memory, a read-only memory, a programmable read-only memory or an erasable programmable memory, a register and other storage media mature in the art. The storage medium is located in the memory, and the processor reads the information in the memory, and completes the steps of the above method in combination with its hardware.

The memory mentioned above includes, but is not limited to:

a volatile memory and/or a non-volatile memory. The non-volatile memory may be a Read-Only Memory (ROM), a Programmable Read-Only Memory (PROM), an Erasable Programmable Read-Only Memory (EPROM), an Erasable Programmable Read-Only Memory (EPROM), an Electrically EPROM (EEPROM) or a flash memory. The volatile memory may be a Random Access Memory (RAM), which acts as an external cache. By way of example and not limitation, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a synch link DRAM (SLDRAM) and a Direct Rambus RAM (DR RAM).

It should be noted that the memory described herein is intended to include these and any other suitable types of memory.

Embodiments of the present application also provide a computer-readable storage medium for storing a computer program. The computer-readable storage medium stores one or more programs including instructions that, when executed by a portable electronic device including a plurality of application programs, enable the portable electronic device to perform the methods of the method embodiments.

Optionally, the computer-readable storage medium can be applied to each network element in the embodiments of the present application, and the computer program enables the computer to execute the corresponding processes implemented by the corresponding network element in each method of the embodiments of the present application, which is not elaborated here for brevity.

Optionally, the computer-readable storage medium can be applied to the mobile terminal/terminal device in the embodiments of the present application, and the computer program enables the computer to execute the corresponding processes implemented by the mobile terminal/terminal device in each method of the embodiments of the present application, which is not elaborated here for brevity.

The embodiments of the present application also provide a computer program product, including a computer program.

Optionally, the computer program product can be applied to each network element in the embodiments of the present application, and the computer program enables the computer to execute the corresponding process implemented by the corresponding network element in each method of the embodiments of the present application, which is not elaborated here for brevity.

Optionally, the computer program product can be applied to the mobile terminal/terminal device in the embodiments of the present application, and the computer program enables the computer to execute the corresponding processes implemented by the mobile terminal/terminal device in each method of the embodiments of the present application, which is not elaborated here for brevity.

A computer program is also provided in the embodiments of the present application. When the computer program is executed by a computer, it enables the computer to perform the methods of the method embodiments.

Optionally, the computer program can be applied to each network element in the embodiments of the present application, and when the computer program is run on the computer, the computer is made to execute the corresponding processes implemented by the corresponding network elements in each method of the embodiments of the present application, which is not elaborated here for brevity.

In addition, an embodiment of the present application also provides a communication system, the communication system may include the above-mentioned terminal device and various network elements to form the communication system 100 as shown in FIG. 1, which is not elaborated here for brevity. It should be noted that the terms "system" and the like in the present disclosure may also be referred to as "a network management architecture" or "a network system" or the like.

It should also be understood that the terms used in the embodiments of the present application and the appended claims are only for the purpose of describing specific embodiments, and are not intended to limit the embodiments of the present application.

For example, as used in the embodiments of the present application and the appended claims, the singular forms "a", "the", "the above" and "said" are intended to include the plural forms as well, unless the context clearly indicates other meanings.

Those skilled in the art can realize that the units and algorithm steps of each example described in conjunction with the embodiments disclosed herein can be implemented in electronic hardware, or a combination of computer software and electronic hardware. Whether these functions are performed in hardware or software depends on the specific application and design constraints of the technical solution. Skilled persons may use different methods to implement the described functions for each specific application, but such implementations should not be considered beyond the scope of the embodiments of the present application.

If it is implemented in the form of a software functional unit and sold or used as an independent product, it may be stored in a computer readable storage medium. Based on such understanding, the essence or the part that contributes to the related art of the technical solution of the present application or a part of the technical solution may be embodied in the form of a software product, and the computer software product is stored in a storage medium, which includes several instructions for enabling a computer device (which may be a personal computer, a server, or a network device, etc.) to execute all or part of the steps of the methods described in the various embodiments of the present application. The aforementioned storage media include: a U disk, a mobile hard disk, a Read-Only Memory (ROM), a Random Access Memory (RAM), a magnetic disk, an optical disk, or other media that can store program codes.

Those skilled in the art can clearly understand that, for the convenience and brevity of description, the specific working process of the above-described systems, apparatuses and units may refer to the corresponding processes in the foregoing method embodiments, which will not be elaborated here.

In the several embodiments provided in the present application, it should be understood that the disclosed systems, apparatuses and methods may be implemented in other manners.

For example, the division of units, modules or components in the apparatus embodiments described above is only a logical function division, and other division methods may be used in actual implementation. For example, multiple units, modules or components may be combined or integrated to another system, or some units or modules or components can be ignored, or not implemented.

For another example, the above-mentioned units/modules/components described as separate/display components may or may not be physically separated, that is, may be located in one place, or may be distributed to multiple network units. Some or all of the units/modules/components may be selected according to actual needs to achieve the purpose of the embodiments of the present application.

Finally, it should be noted that the mutual coupling or direct coupling or communication connection shown or discussed above may be through some interfaces, indirect coupling or communication connection of devices or units, which may be electrical, mechanical or other forms.

The above contents are only specific implementations of the embodiments of the present application, but the protection scope of the embodiments of the present application is not limited thereto. Changes or substitutions should all be covered within the protection scope of the embodiments of the present application. Therefore, the protection scope of the embodiments of the present application should be subject to the protection scope of the claims.

What is claimed is:

1. A wireless communication method, wherein the method is applicable to a terminal management network element, and the method comprises:
receiving a second request, wherein the second request is used for requesting at least one of following operations for a terminal device: re-authorization, re-authentication, revocation of authorization, or revocation of authentication;
determining a target network element; and
sending the second request to the target network element, wherein the determining the target network element comprises:
determining a second target manner corresponding to a second operation, wherein the second operation comprises at least one of authorization, authentication, re-authorization or re-authentication, revocation of authorization or revocation of authentication; and
determining the target network element based on the second target manner,
wherein the second target manner comprises a first manner and/or a second manner, the first manner refers to that the terminal device sends information for performing the second operation through a registration process, and the second manner refers to that the terminal device sends the information for performing the second operation through a session management process; and the determining the target network element based on the second target manner, comprises:
in a case that the second target manner is the first manner, determining a mobility management network element as the target network element; and in a case that the second target manner is the second manner, determining a session management network element as the target network element.

2. The method according to claim 1, wherein the determining the target network element comprises:
determining a session management network element as the target network element.

3. The method according to claim 1, wherein the determining the second target manner corresponding to the second operation comprises:
determining the second target manner based on a first mapping relationship, wherein the first mapping relationship comprises a parameter corresponding to the first manner and/or a parameter corresponding to the second manner.

4. The method according to claim 3, wherein the determining the second target manner based on the first mapping relationship comprises:
in a case that a parameter of the terminal device matches the parameter corresponding to the first manner, determining the first manner as the second target manner; and in a case that the parameter of the terminal device matches the parameter corresponding to the second manner, determining the second manner as the second target manner.

5. The method according to claim 3, wherein the parameters belong to at least one of following information:
area information, Public Land Mobile Network (PLMN) information or time information.

6. The method according to claim 3, wherein the first mapping relationship information is preconfigured.

7. The method according to claim 1, wherein the determining the second target manner corresponding to the second operation comprises:

obtaining query information through unified data storage (UDR) or unified data management (UDM), wherein the query information is used for indicating information of a mobility management network element and/or a session management network element serving the terminal device, and/or, the query information is used for indicating whether the mobility management network element and/or the session management network element supports the second operation; and determining the second target manner based on the query information.

8. A mobility management network element, comprising:

a receiving unit, configured to receive a third request, wherein the third request is used for requesting at least one of following operations for a terminal device: re-authorization, re-authentication, revocation of authorization, or revocation of authentication; and a sending unit, configured to send the third request to the terminal device, wherein the receiving unit is further configured to receive the third request sent by a session management network element, wherein the third request comprises first indication information, and the first indication information is used for determining a first target manner corresponding to a first operation, and the first operation comprises at least one of authorization, authentication, re-authorization, or re-authentication, wherein the first target manner comprises a first manner and/or a second manner, the first manner refers to that the terminal device sends information for performing the first operation through a registration process, and the second manner refers to that the terminal device sends the information for performing the first operation through a session management process.

9. The mobility management network element according to claim 8, wherein the receiving unit is further configured to receive the third request sent by a terminal management network element.

10. A terminal management network element, comprising:

a processor, a memory and a transceiver, wherein the memory is configured to store a computer program, and the processor is configured to invoke and run the computer program stored in the memory to:

receive a second request, wherein the second request is used for requesting at least one of following operations for a terminal device: re-authorization, re-authentication, revocation of authorization or revocation of authentication;

determine a target network element; and send the second request to the target network element, wherein the processor is further configured to:

determine a second target manner corresponding to a second operation, wherein the second operation comprises at least one of authorization, authentication, re-authorization or re-authentication, revocation of authorization or revocation of authentication; and determine the target network element based on the second target manner, wherein the second target manner comprises a first manner and/or a second manner, the first manner refers to that the terminal device sends information for performing the second operation through a registration process, and the second manner refers to that the terminal device sends the information for performing the second operation through a session management process; and the processor is further configured to:

in a case that the second target manner is the first manner, determine a mobility management network element as the target network element; and in a case that the second target manner is the second manner, determine a session management network element as the target network element.

11. The terminal management network element according to claim 10, wherein the processor is further configured to:

determine a session management network element as the target network element.

12. The terminal management network element according to claim 10, wherein the processor is further configured to:

determine the second target manner based on a first mapping relationship, wherein the first mapping relationship comprises a parameter corresponding to the first manner and/or a parameter corresponding to the second manner.

13. The terminal management network element according to claim 12, wherein the processor is further configured to:

in a case that a parameter of the terminal device matches the parameter corresponding to the first manner, determine the first manner as the second target manner; and in a case that the parameter of the terminal device matches the parameter corresponding to the second manner, determine the second manner as the second target manner.

14. The terminal management network element according to claim 12, wherein the parameters belong to at least one of following information:

area information, Public Land Mobile Network (PLMN) information or time information.

15. The terminal management network element according to claim 12, wherein the first mapping relationship information is preconfigured.

16. The terminal management network element according to claim 10, wherein the processor is further configured to:

obtain query information through unified data storage (UDR) or unified data management (UDM), wherein the query information is used for indicating information of a mobility management network element and/or a session management network element serving the terminal device, and/or, the query information is used for indicating whether the mobility management network element and/or the session management network element supports the second operation; and determine the second target manner based on the query information.

* * * * *